(12) United States Patent
Simmons

(10) Patent No.: US 7,323,028 B2
(45) Date of Patent: Jan. 29, 2008

(54) AIR INTAKE FILTER SCREEN ASSEMBLY

(76) Inventor: Randy Simmons, 5924 Owl Nest Dr., West Chester, OH (US) 45069

(\*) Notice: Subject to any disclaimer, the term of this patent is extended or adjusted under 35 U.S.C. 154(b) by 484 days.

(21) Appl. No.: 11/023,195

(22) Filed: Dec. 27, 2004

(65) Prior Publication Data

US 2005/0279064 A1 Dec. 22, 2005

Related U.S. Application Data

(63) Continuation-in-part of application No. 10/870,608, filed on Jun. 17, 2004.

(51) Int. Cl.
*B01D 46/00* (2006.01)

(52) U.S. Cl. .............................. 55/495; 55/351; 55/478; 55/481; 55/491; 55/492; 55/DIG. 31; 55/501; 55/506

(58) Field of Classification Search ................... 55/351, 55/354, 478, 481, 490, 491, 492, 495, 501, 55/503, 506, DIG. 31
See application file for complete search history.

(56) References Cited

U.S. PATENT DOCUMENTS

| 3,058,279 | A | * | 10/1962 | Metcalfe ....................... 55/495 |
| 3,950,157 | A | * | 4/1976 | Matney ........................ 55/490 |
| 4,288,992 | A | | 9/1981 | Eliason ........................ 62/256 |
| 5,156,662 | A | * | 10/1992 | Downing et al. .............. 55/495 |
| 5,266,090 | A | | 11/1993 | Burnett ........................ 55/333 |
| 5,370,722 | A | | 12/1994 | Simmons ..................... 55/351 |
| 5,525,145 | A | | 6/1996 | Hodge .......................... 96/17 |
| 5,529,593 | A | | 6/1996 | Simmons ..................... 55/354 |
| D402,356 | S | | 12/1998 | Hodge ....................... D23/365 |
| 5,904,744 | A | | 5/1999 | Kagan ....................... 55/385.1 |
| 5,935,282 | A | * | 8/1999 | Lin ............................... 55/495 |
| 6,174,340 | B1 | | 1/2001 | Hodge ....................... 55/385.1 |
| 6,197,077 | B1 | * | 3/2001 | Simmons et al. ............. 55/351 |
| 6,279,335 | B1 | | 8/2001 | Jacobs ......................... 62/249 |
| 6,361,578 | B1 | * | 3/2002 | Rubinson ..................... 55/495 |
| 6,406,508 | B1 | * | 6/2002 | Bloomer ....................... 55/490 |
| 6,527,838 | B2 | | 3/2003 | Volo et al. ................... 96/134 |
| 6,743,282 | B2 | * | 6/2004 | Najm .......................... 55/351 |
| 2003/0070769 | A1 | | 4/2003 | Lampers ..................... 160/113 |
| 2004/0172927 | A1 | * | 9/2004 | Lee ............................. 55/495 |

\* cited by examiner

*Primary Examiner*—Jason M. Greene
(74) *Attorney, Agent, or Firm*—Gifford, Krass, Sprinkle, Anderson, Citkowski, P.C.

(57) ABSTRACT

A filter screen assembly for use with an air intake structure, the structure including a face within which is formed an air intake opening. The filter screen assembly includes a screen having a flexible mesh material and an outer perimeter edge. The perimeter edge is secured at specified locations to the face of the air intake structure, by a plurality of fastener components each including a fixed portion and an actuating portion, in order to filter out contaminants associated with an air stream entering the intake structure and to prevent the screen from being drawn into the air intake opening. Alternatively, at least one elongated track may be secured to a face of the intake structure proximate the intake opening and, in use with a plurality of traversably secured trolley hooks, operates to advance the screen in a given fashion across the intake opening.

16 Claims, 11 Drawing Sheets

AIR INTAKE FILTER SCREEN ASSEMBLY

CROSS REFERENCE TO RELATED APPLICATIONS

The present application is a continuation-in-part of U.S. application Ser. No. 10/870,608, filed Jun. 17, 2004, for an Air Intake Filter Screen Assembly.

BACKGROUND OF THE INVENTION

1. Field of the Invention

The present invention relates generally to filter screen assemblies and, more specifically, to an air filter screen assembly in use with an intake of an associated structure, such as an industrial cooling tower, HVAC structure, or the like.

2. Description of the Prior Art

The prior art is well documented with examples of filter assemblies, and in particular those in use with air intake structures. The objective in such instances is to provide an effective screen covering for a structural air intake, and such as in particular a cooling tower or other similar industrial based structure.

A first example drawn from the prior art is disclosed in U.S. Pat. No. 5,370,722, issued to Simmons, which teaches a filtering assembly for protecting an air intake of a structure and including a flexible screen mounted so as to cover the air intake. The screen is selectively moved in either of opposite directions, such as through application of first and second pulley assemblies located on opposite sides of the screen which are engaged by pull ropes to raise and lower the screen. A container is located at a base of the structure, beneath the intake opening, and stores the flexible screen when not in use.

In a second preferred embodiment, first and second containers are secured to the structure at locations above and below the intake opening. The flexible screen is formed as first and second interconnected and cylindrical rolls placeable within the containers and operable by a crank to advance an intermediate, unrolled and interconnected portion of the screen across the intake opening.

A further example of the prior art is disclosed in U.S. Pat. No. 6,197,077, also issued to Simmons, and disclosing a filter screen assembly mounted over an air intake structure having a height, width and depth and which defines a selected face within which the air intake opening is formed. A planar and flexible filtration screen defines a substantially rectangular shape with top, bottom and first and second side edges. Fasteners are provided for securing the sides of the screen to corresponding sides of the intake structure and include eyelets formed within the screen which are supported upon tubular portions extending from the structure and fasteners which secure within the tubular portions to affix the screen in place.

In a preferred embodiment, a stiffening and engaging bar associated with a top edge of the flexible screen includes upwardly extending hooks 36 and 38 which are secured upon an engaging bar mounted in extending fashion along a top edge of the structure. A side extending engagement of the screen is facilitated by collars secured to the edges of the air intake structure and to which eyelets formed along the screen edges are aligned and secured thereover through the further addition of screws or the like.

U.S. Pat. No. 6,279,335, issued to Jacobs, teaches a refrigerated case cover having a cover sheet constructed of an insulating material and having air cells sandwiched between an outer cover sheet and an inner cover sheet. Eyelets are disposed along the top and bottom edges of the cover and a cord is woven through the lower eyelets. A male tab is disposed on each cover sheet side and the cover is attached to a refrigerated case by attaching the upper eyelets to an upper case front lip by means of S hooks, and attaching the cord to grille spokes disposed along a lower case front upper edge with S hooks, and by attaching each cover sheet side to a respective case side with hook-and-loop material. In an alternate embodiment, a refrigerated case cover has weights disposed along the cover sheet lower edge in order to keep the refrigerated case cover sealed against a refrigerated case lower front, and to expedite installation and removal of the refrigerated case cover.

SUMMARY OF THE PRESENT INVENTION

The present invention is a filter screen assembly for use with an air intake structure, such as typically a cooling tower, HVAC structure or the like. The filter screen or netting assembly is intended to be quick and easy to install and to specifically reduce the amount of work required for installation and removal as needed.

In each of the preferred embodiments, a screen is constructed of a mesh (typically flexible) material and including an outer perimeter edge. The perimeter edge is secured at specified locations to the face of the air intake structure, such as to filter out contaminants associated with an air stream entering the intake structure and to prevent the screen from being drawn into the air intake opening.

The intake structure typically includes a face within which is formed the air intake opening. In a first preferred embodiment, first and second rods extend along the air intake face and in proximity to the intake opening. Fasteners extend from the perimeter edge of the screen for engaging the rods, such as including snap hooks, rings or straps.

A number of apertures may also be formed at locations along the perimeter edge and through which is engaged other fasteners (e.g., screws, bolts, snaps, hooks, stud adapters, button mechanisms and the like) in order to provide additional engagement of the filter screen to the air intake face and to again prevent the screen from being drawn into the intake opening in use.

In a further embodiment, the perimeter extending mounting fasteners may provide the sole means for securing the perimeter edge to the face of the air intake structure and, in a yet further application, it is envisioned that the fasteners and mounting apertures can be substituted by hook-and-loop fasteners established between the inner facing surface of the perimeter edge and an outer facing surface of the air intake face and in order to reasonably secure the filter screen assembly.

A yet additional preferred embodiment contemplates the use of spring-loaded and gripping clamps secured to locations of the air intake face in order to grip the perimeter edge of the filter screen assembly over the air intake opening. The screen may further include one or more axially extending and stiffening elements associated with the perimeter edge and which are gripped by the clamps in order to be secured in place.

An additional embodiment contemplates providing elongate extending cables or rods, along such as either two or four extending perimeter edges of the screen assembly, which are typically threaded through looped edges of the screen. To provide for selective loosening or tensioning of a given edge of the screen assembly, a turnbuckle is positioned between a selected one of the mounting locations and an associated end of a given cable. In a still further arrangement, the perimeter edge may be constructed as outer and inner frame portions, and between which is sandwichingly engaged the mesh material.

Further embodiments incorporate pluralities of rotatable fasteners secured to the air intake face and proximate the intake opening. In one embodiment, each of the fasteners may include a twist-and-lock component, secured to a selected location along the air intake face. The filter screen includes appropriately shaped grommet reinforced openings along its edges and, upon aligning and successively applying each opening over an associated component, an outermost twist portion is rotated to grasp and secure the filter screen.

In an additional embodiment, the twist-and-lock component associated with each of the fasteners is replaced by a pivotally secured element, such as referenced as a cufflink style fastener. Each of the pivotally secured elements are, as with the twist-and-lock components, selectively aligned and inserted through associated grommet openings associated with the filter screen, and subsequently rotated to an engaged position. It is also envisioned that, in addition to the application of the twist-and-lock and cufflink style fasteners to larger sized air intake and filtration structures, the same can be applied to smaller air handling units such as for example smaller sized air conditioning units.

A yet further variant of fastener contemplates the use of an extending and internally channeled track with trolley hooks and in order to translate the screen across the intake opening. In one variant, an elongated and substantially "U" shaped extrusion is secured to the air intake face across at least a top edge of the associated air intake opening. Any suitable type of fastener including those described herein secure locations along the sides and, depending upon the installation of a second track extrusion, along the corresponding bottom edge of the air intake face. Either configuration allows the filter to translate horizontally across the intake opening, in and out of position, and as needed based on seasonal requirements.

A still further revised variant discloses a filter installation in which the "U" shaped channels extend vertically along the sides, and as opposed to the top or top and bottom of the air intake face. In this variant, a stiffener is incorporated into the filter screen, along its top edge, and includes at least one location to which is secured an end of a pulley arrangement mounted in overhead extending fashion relative to the air intake opening. A pulley rope is employed to raise and lower the filter, however it is also contemplated that any suitable motorized or mechanical cranking device may be employed for raising and lowering the filter in and out of position. Additionally, the use of alternate track fastening systems and methods are also contemplated in addition to the use of a cable as described herein.

BRIEF DESCRIPTION OF THE DRAWINGS

Reference will now be made to the attached drawings, when read in combination with the following detailed description, wherein like reference numerals refer to like parts throughout the several views, and in which:

FIG. 1A is a partial view of an edge of a screen, such as illustrated in FIG. 1, and illustrating examples of hooks, snap hooks, rings or other looping fasteners that attach to the rod or cable and which can be utilized in substitution of the straps in FIG. 1;

DETAILED DESCRIPTION OF THE PREFERRED EMBODIMENTS

Figure 1:
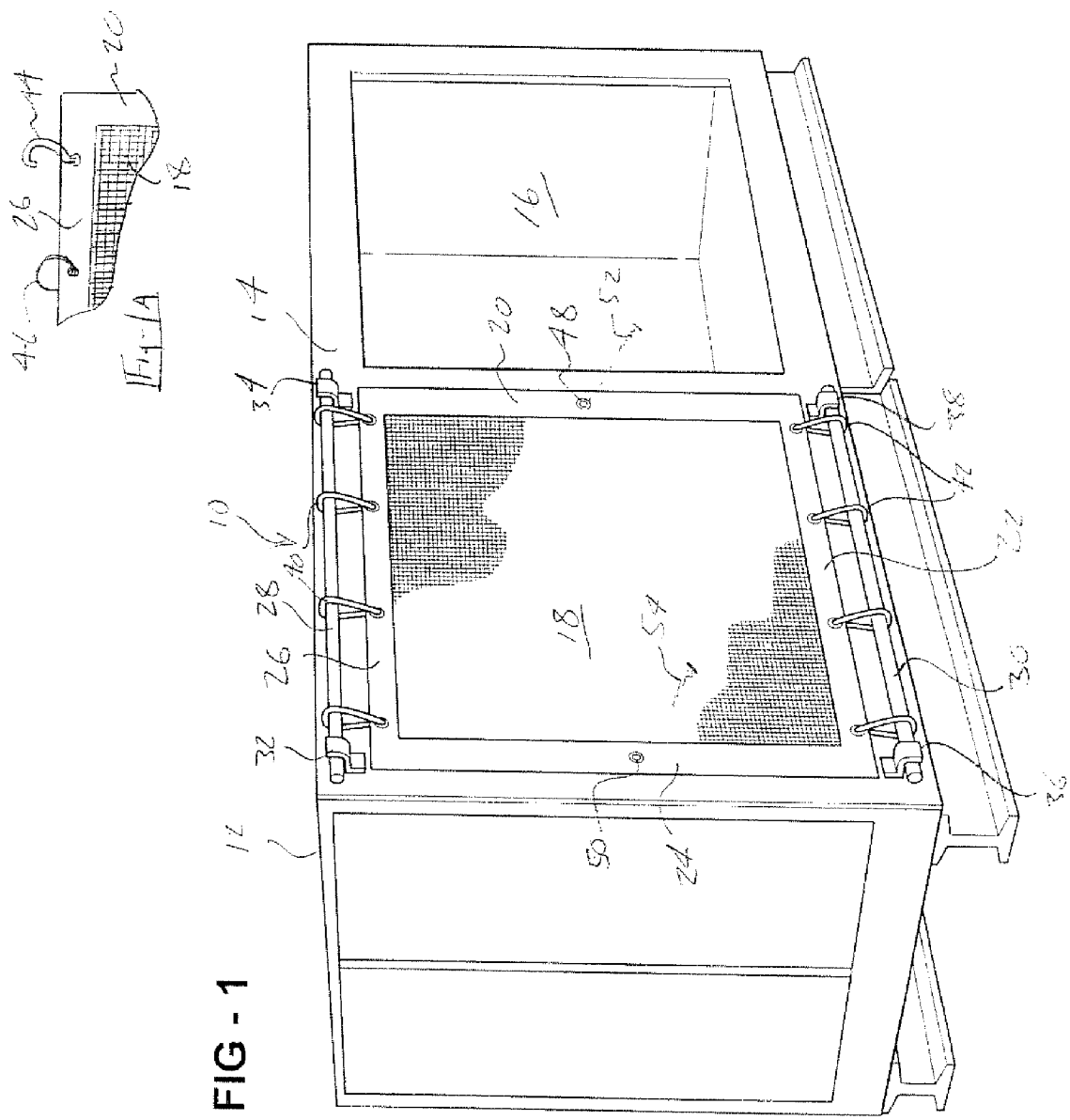
FIG. 1 is a perspective view of a filter screen assembly for use with an air intake structure according to a first preferred embodiment of the present invention.

Referring now to FIG. 1, a filter screen assembly is illustrated generally at 10 in use with an air intake structure 12 and according to a first preferred embodiment of the present invention. As previously described, the air intake structure 12 can include such as a cooling tower, HVAC structure, or the like and which in each instance includes at least one facing surface 14, within which is formed an air intake opening, see further by example at 16 in FIG. 1, and in addition to an identical air intake opening obscured by the filter screen assembly 10.

Referring again to FIG. 1, the filter screen assembly 10 includes a screen 18 constructed of a mesh (typically flexible) material and including an outer perimeter edge. In the preferred embodiments illustrated, the screen exhibits a rectangular, or four-sided, configuration, and with interconnected perimeter edges 20, 22, 24 and 26. It is further understood that an outer configuration exhibiting any number of sides, ranging from a three-sided triangle to a circular-shaped filter (this exhibiting an infinite number of sides) is possible within the scope of the invention. The outer perimeter edge may further include, without limitation, a reinforced stitching, another material which complements the central mesh screen 18 or, as will be further described, provision of a stiffening or other type of reinforcing portion to provide strength and/or rigidity about the outer periphery of the screen assembly.

The perimeter edge is secured at specified locations to the face of the air intake structure, such as to filter out contaminants associated with an air stream entering the intake structure and to prevent the screen from being drawn into the air intake opening. In the first illustrated embodiment, first and second rods 28 and 30 extend along the air intake face and in proximity to the associated intake opening. The rods 28 and 30 can be supported or secured in any desired fashion, and such as is illustrated by being welded or otherwise secured to end brackets, see at 32 and 34 for rod 28 and further at 36 and 38 for rod 30. The cables or rods can also be mounted vertically left and right.

Fasteners extend from the perimeter edges, in this case top edge 26 and bottom edge 30 of screen 18, and which are engageable with the rods 28 and 30. In the example illustrated, upper straps 40 and lower straps 42 engage the rods 28 and 30, respectively, to establish the screen 18 in a generally taut manner over the air intake opening. Additional types of fasteners, capable of being substituted for the upper and lower straps 40 and 42, may alternately be provided and which, as illustrated in FIG. 1A, can include such as including snap hooks 44, rings 46 and the like.

A number of apertures may also be formed at locations along the perimeter edge, and such as which are illustrated in FIG. 1 by aperture 48 formed in perimeter edge 20 and aperture 50 in perimeter edge 24. Although only a single aperture 48 and 50 is illustrated along each of extending sides 20 and 24, it is envisioned that any number of apertures can be provided along any or all of the four extending perimeter edges and through which are engaged fasteners such as screws, bolts, snaps, hooks, stud adapters, button mechanisms and the like (see for example at 52 and 54) in order to provide additional engagement of the filter screen to the air intake face and to again prevent the screen from being drawn into the intake opening in use.

Figure 2:
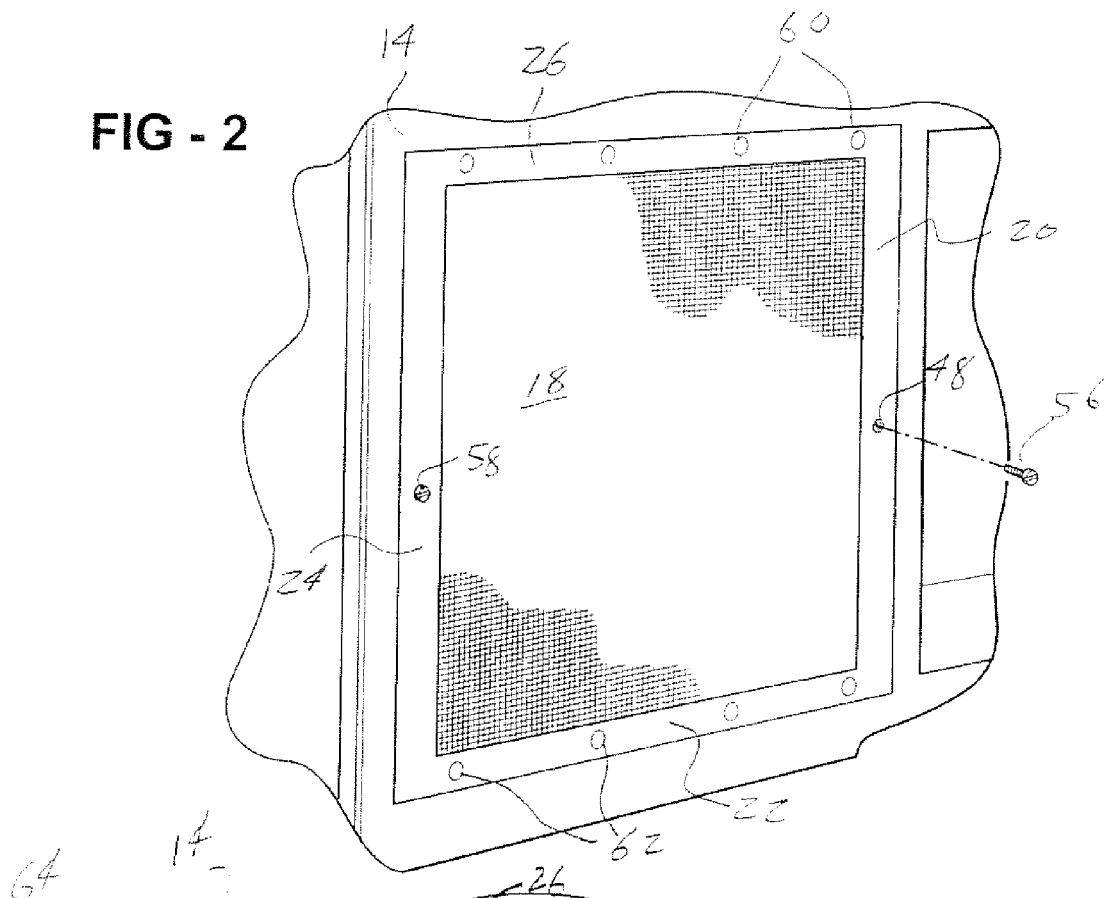
FIG. 2 is a sectional perspective of a filter screen assembly according to a second preferred embodiment.

In the further illustrated embodiment of FIG. 2, the perimeter extending mounting fasteners, see bolts 56 and 58, may provide the sole means for securing the perimeter edge to the face of the air intake structure. The upper straps 40 and lower straps 42 as shown in FIG. 1 are illustrated removed from the respective upper 26 and lower 22 perimeter edges and by which upper extending apertures 60 and lower extending apertures 62 are clearly illustrated. It is envisioned that additional bolts, screws, or other available fasteners may be inserted through upper 60 and lower 62 spaced apart apertures in order to secure the filter screen assembly to the air intake face 14.

Figure 3:
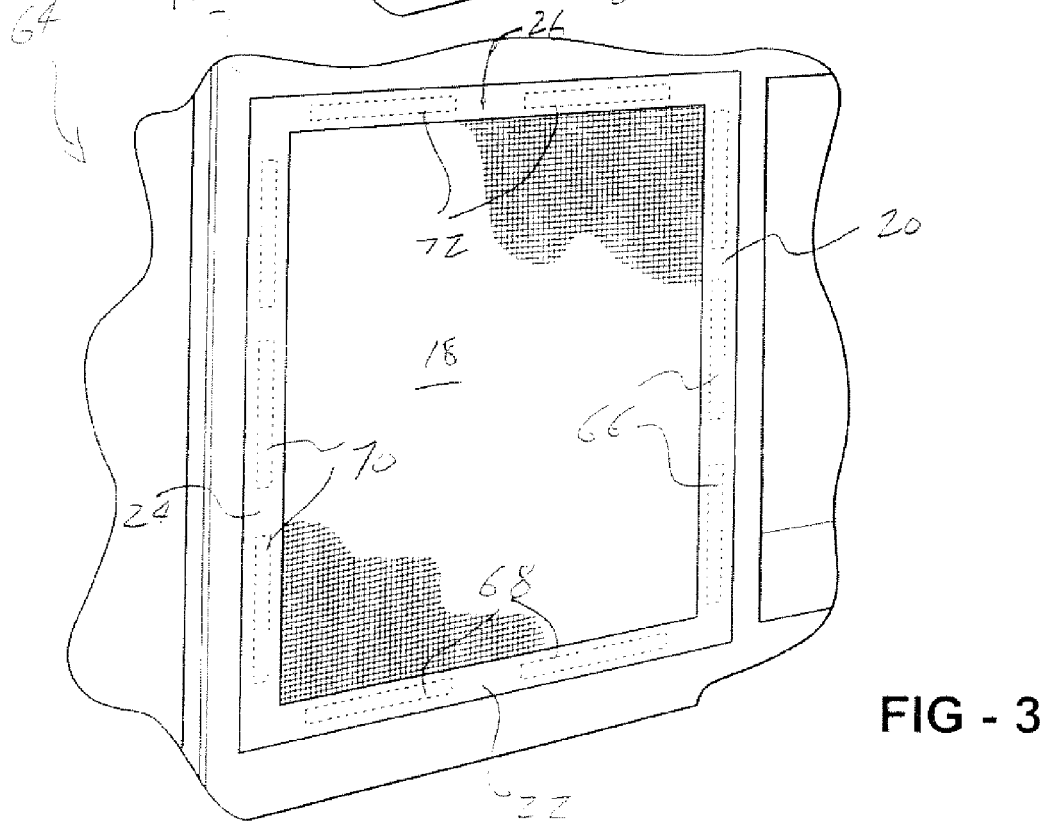
FIG. 3 is a sectional perspective of a filter screen assembly according to a third preferred embodiment of the present invention.

Referring to FIG. 3, and in a yet further application 64, it is envisioned that the fasteners and mounting apertures can be substituted by hook-and-loop fasteners, see at 66, 68, 70 and 72 for each of perimeter edges 20, 22, 24 and 26, respectively. The hook-and-loop fasteners are commercially best known as releasably engageable Velcro® portions and which are established between the inner facing surfaces of the interconnected perimeter edges and the outer facing surface 14 of the air intake face, in order to releasably secure the filter screen assembly in place.

Figure 4:
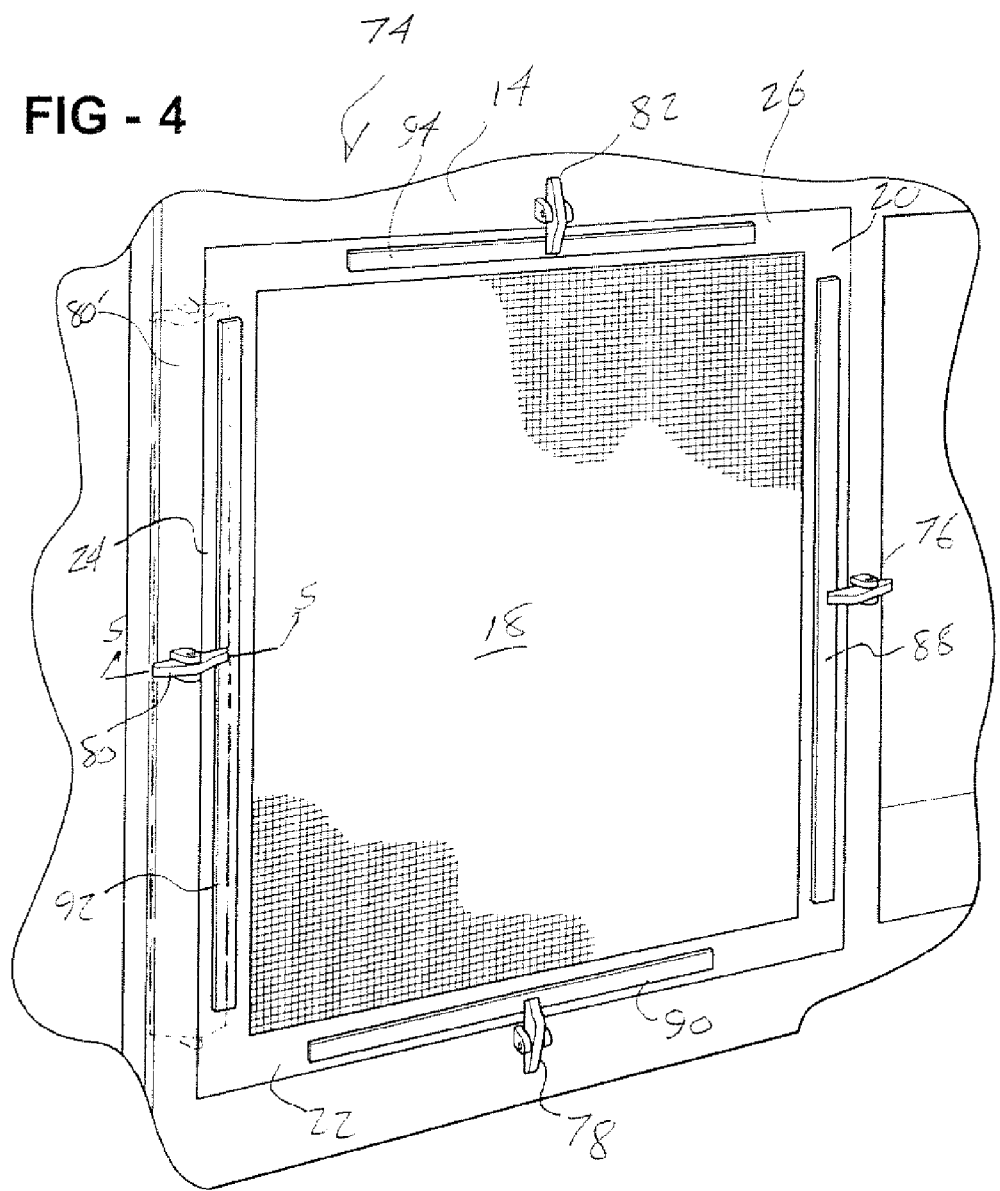
FIG. 4 is a sectional perspective of a filter screen assembly according to a fourth preferred embodiment of the present invention.

Referring now to FIG. 4, a yet additional preferred embodiment is illustrated generally at 74 and contemplates the use of spring-loaded and gripping clamps, see at 76, 78, 80 and 82, secured to locations of the air intake face 14 in order to grip the interconnected perimeter edges 20, 22, 24 and 26 of the filter screen assembly over the air intake opening. As is also illustrated in the cutaway illustration of FIG. 5, each of the clamps (and referencing in particular clamp 80 associated with extending perimeter edge 24) includes a spring-loaded arm (see coil spring 84) securing the clamp in pivotal and biasing fashion to a pedestal 86, and which is in turn secured to a location along the face 14 of the intake structure. In an alternate variant (not shown), each clamp may consist of two sections in which screws go through the top and/or bottom sections of the clamp.

The screen may further include one or more axially extending and stiffening elements (these typically consisting of a rigidized metal, plastic, nylon or like material) associated with the perimeter edge and which are gripped by the clamps 76, 78, 80 and 82 in order to be secured in place. In particular, stiffening elements 88, 90, 92 and 94 are shown secured to perimeter edges 20, 22, 24 and 26, respectively. As illustrated in FIG. 4, the stiffening elements 88, 90, 92 and 94 are secured (adhesively or mechanically) to exterior facing sides of the perimeter edges 20, 22, 24 and 26.

Figure 5:
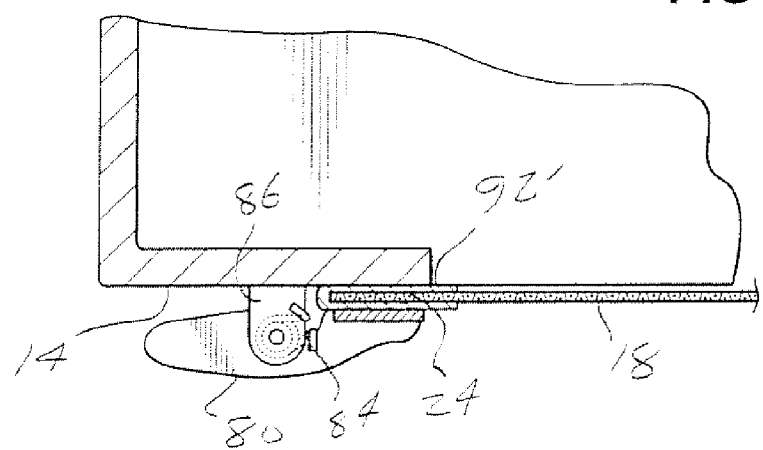
FIG. 5 is a cutaway view taken along line 5-5 of FIG. 4 and showing the nature of the application of clamping pressure to reinforced edge locations of the filter screen according to the present invention.

As further illustrated in the sectional cutaway of FIG. 5, the stiffening element can comprise a folded perimeter extending element, see at 92', which sandwiches about the associated perimeter edge 24 of the screen. As is also illustrated in FIG. 4, a lengthened phantom illustration 80' is shown of the clamp 80 and which is intended to illustrate a further variant of the invention by which the clamps are understood to be capable of extending substantially a full length of each perimeter extending side and which sandwiches the filter edge along the substantial length. It is further understood that the stiffening elements and clamps can be used alternately or not at all within the scope of the invention.

Figure 6:
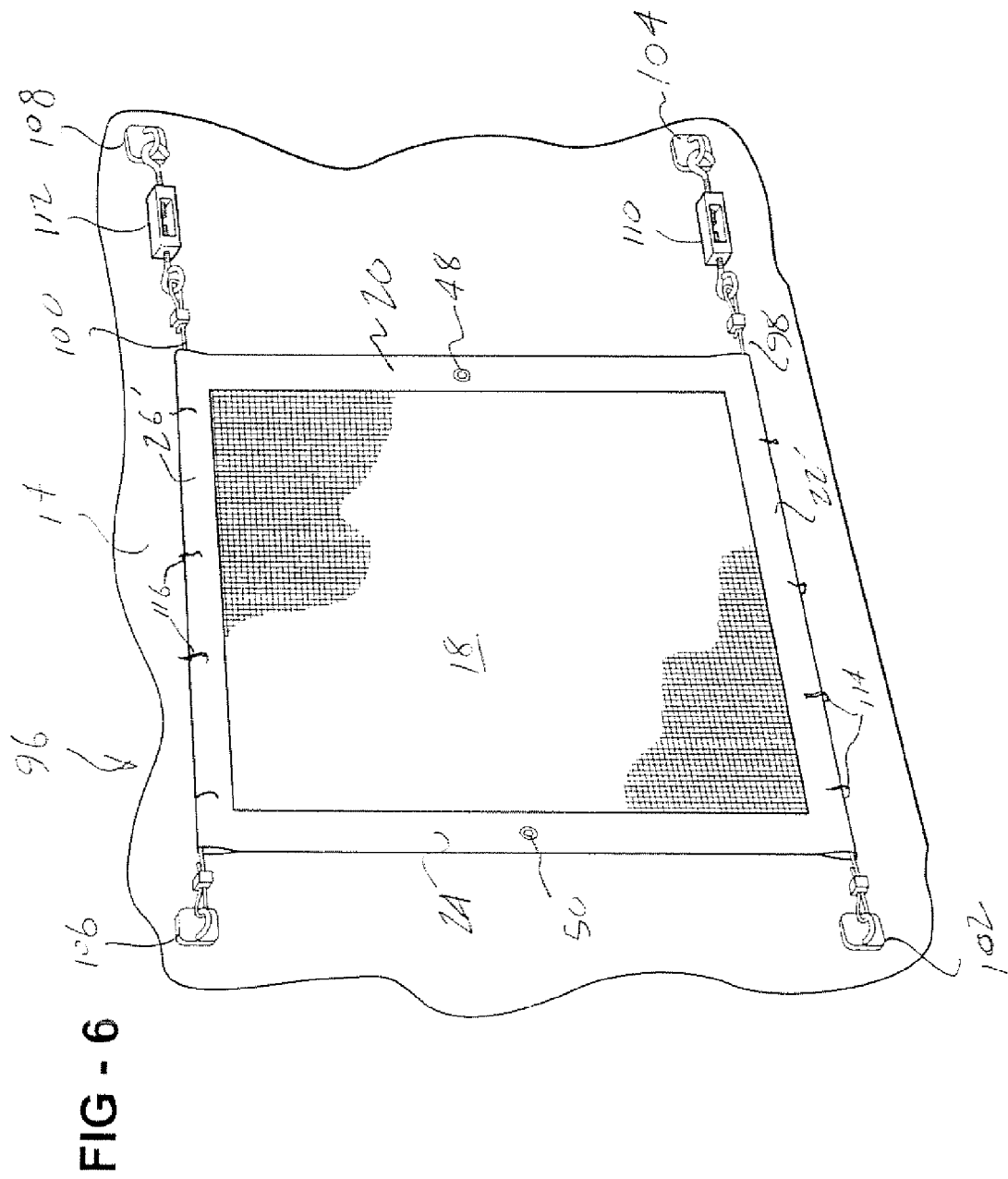
FIG. 6 is a further sectional illustration of a filter screen assembly according to a fifth preferred embodiment and illustrating first and second tensioning cables or rods extending horizontally along both top and bottom or left and right edges of the filter screen.

Referring now to FIG. 6, an additional embodiment is illustrated at 96 of a modified screen assembly by which upper 26' and lower 22' interconnected and perimeter extending edges of the screen include looped extending edges. Threaded through these edges are extending portions of cables 98 and 100, these in turn being secured at opposite ends to eyebolts (see at 102 and 104 for cable 98 and further at 106 and 108 for cable 100) and such that the cables extend along both the top and bottom locations of the air intake face 14 in proximity to the intake opening. This embodiment calls for attachment to either vertically or horizontally mounted cables or rods using snap hooks or other looping attachment mechanism. Turnbuckles may be eliminated, and instead the ends of the cable can thread through the eyebolt whereby it is pulled taut and folded back onto itself whereby it is held in the taut position using cable clamps.

To provide for selective loosening or tensioning of a given edge of the screen assembly, a turnbuckle, see at 110 for cable 98 and 112 for cable 100, is positioned between a selected one of the mounting locations (see eyebolt mounting locations 104 and 108) and an associated end of a given cable, again at 98 and 100. It is also envisioned that the corresponding perimeter edges 22' and 26' of the screen assembly may be secured to the cables 98 and 100, such as by clips 114 and 116, in order to tension the edges of the screen along with the cables.

Figure 7:
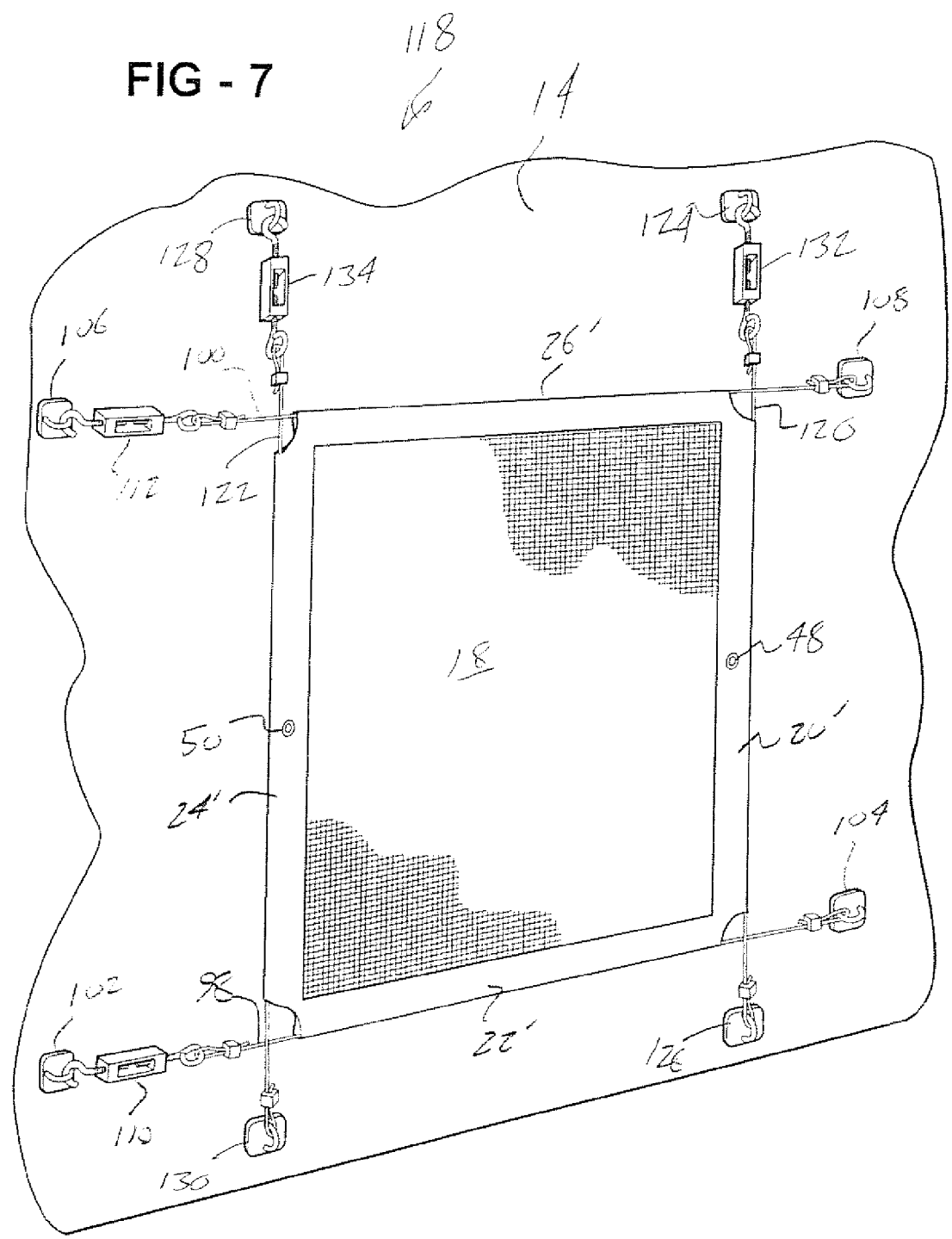
FIG. 7 is a yet further sectional illustration of a variation of the fifth preferred embodiment, shown in FIG. 6, and illustrating an additional and second pair of tensioning cables or rods extending vertically or horizontally along opposite side edges of the filter screen.

Referring to FIG. 7, a variant 118 of the embodiment 96 contemplates the provision of two pairs of extending cables, including again first pair of cables 98 and 100 extending along top and bottom edges of the air intake surface 14, and in addition to a second pair of cables 120 and 122 extending along edges corresponding to modified and looped perimeter edges 20' and 24' associated with the screen 18. As with the first pair of cables, eyebolts 124 and 126 engage opposite ends of the cable 120 and eyebolts 128 and 130 likewise engage opposite ends of cable 122. Turnbuckle assemblies 132 and 134 are again disposed between associated ends of the cables 120 and 122 and the eyebolts 124 and 128, respectively.

Figure 8:
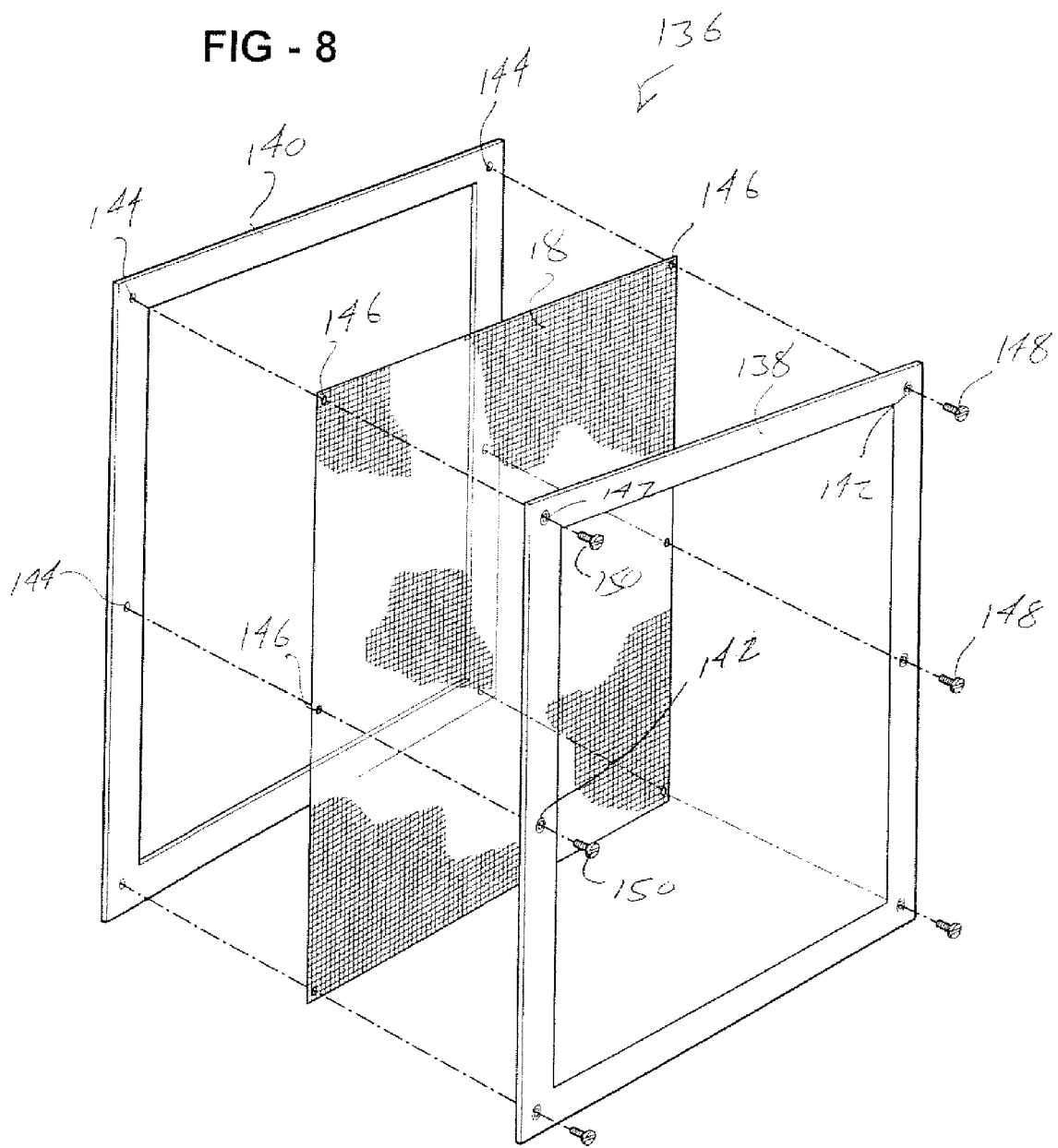
FIG. 8 is an exploded view of a filter screen assembly according to a sixth preferred embodiment of the present invention.

In a further arrangement 136, and referencing FIG. 8, a filter screen assembly is illustrated in exploded fashion and without reference to any given air intake structure. A flexible mesh is again referenced at 18, about a perimeter extending edge of which is sandwiched outer 138 and inner 140 frame portions. Apertures are located at 142 at spaced locations about a periphery of the outer frame 138 and aligning fasteners 144 are likewise formed at spaced locations about the inner frame 140. These coincide with apertures 146 formed in aligning locations about a perimeter of the mesh 18 and which receive fasteners 148 and 150 to secure the sandwiched construction together and in place over the face 14 of the air intake structure.

Figure 9:
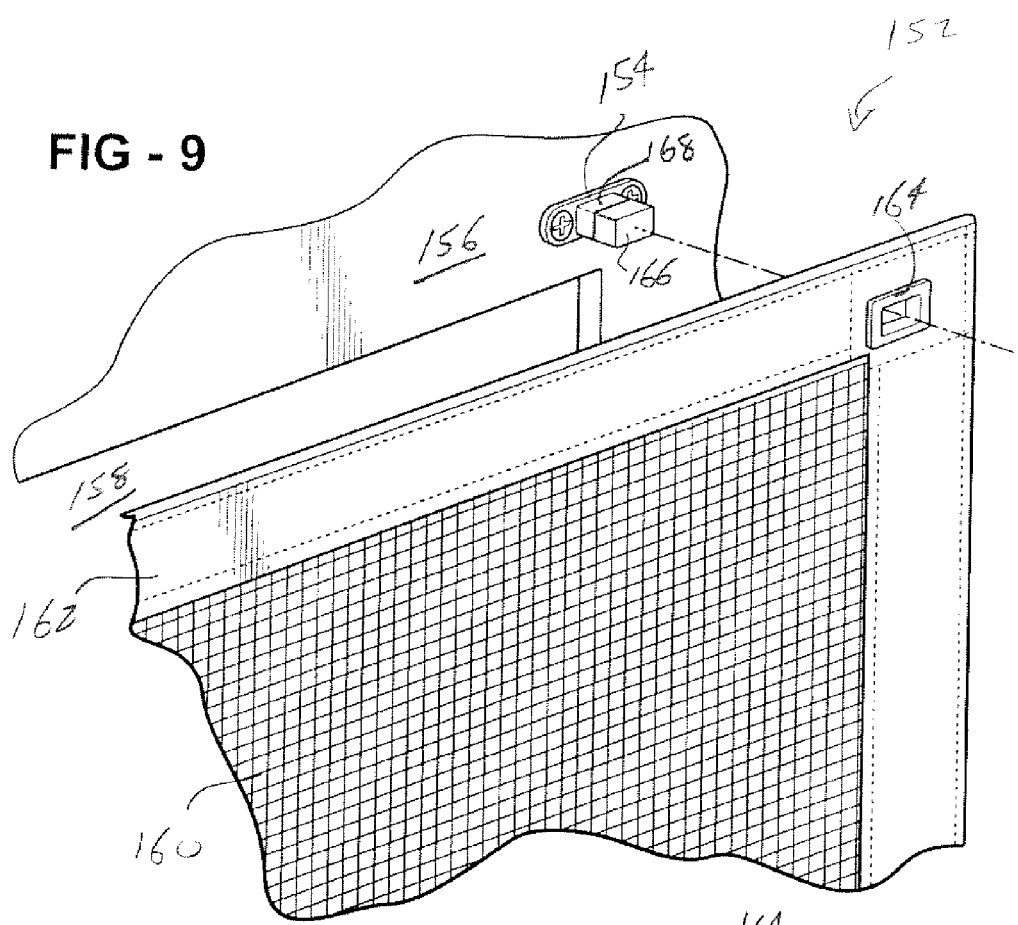
FIG. 9 is a partial exploded perspective of a twist-and-lock fastener component in use with a filter screen and according to a seventh preferred embodiment of the present invention.

Referring now to FIG. 9, a partial exploded perspective is illustrated at 152 of a twist-and-lock fastener component in use with a filter screen and according to a seventh preferred embodiment of the present invention. Specifically, a plurality of fasteners are provided, such as referenced by example at 154, and which are attached to the face 156 of the air intake structure in proximity to the intake opening 158. As is illustrated, the fasteners each include a base component which is secured to the air intake face, such as by screws, it being further understood that other and alternate methods of engagement including welding and other mechanical fasteners can be substituted within the ordinary skill of one in the relevant art.

A filter screen is illustrated at 160, according to a fiber mesh, cottonwood or other suitable filtration material such as previously disclosed, and includes a reinforced outermost perimeter edge 162. A plurality of apertures are provided at selected spaced apart locations associated with either or both horizontal and vertical extending locations of the reinforced edges of the filter screen 160, and as for example illustrated by rectangular shaped reinforcing grommet 164 (constructed from such as a metal or durable plastic) secured to an associated edge location of the filter screen and positioned in alignment with the twist-and-lock fastener 154.

A rotatable component is illustrated at 166, associated with twist-and-lock fastener 152. The twist-and-lock component 166 exhibits a rectangular configuration and which matingly engages through the grommet 164 as further referenced in FIG. 10 in order to engage the filter screen.

An underlying fixed structure 168 forms a part of the fastener 154 and to which the twist-and-lock component 166 is biasingly and rotatively secured. Although not shown, a compression spring or other suitable biasing component may be disposed between the rotatable 166 and fixed 168 components of the fastener and in order to resistively engage the rotatable component 166 in either the aligned position of FIG. 9 or the offset position of FIG. 10.

Figure 10:
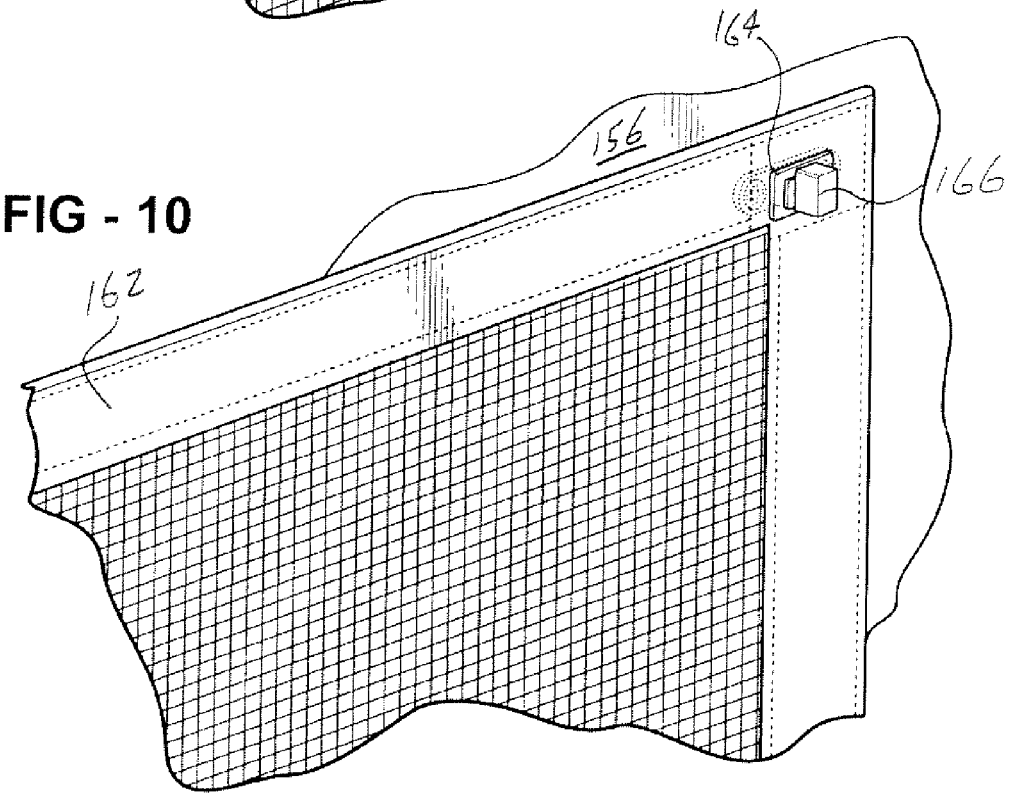
FIG. 10 is a succeeding assembled view of the twist-and-lock fasteners mounted to the air intake face of FIG. 9 and engaging the filter screen.
Figure 11:
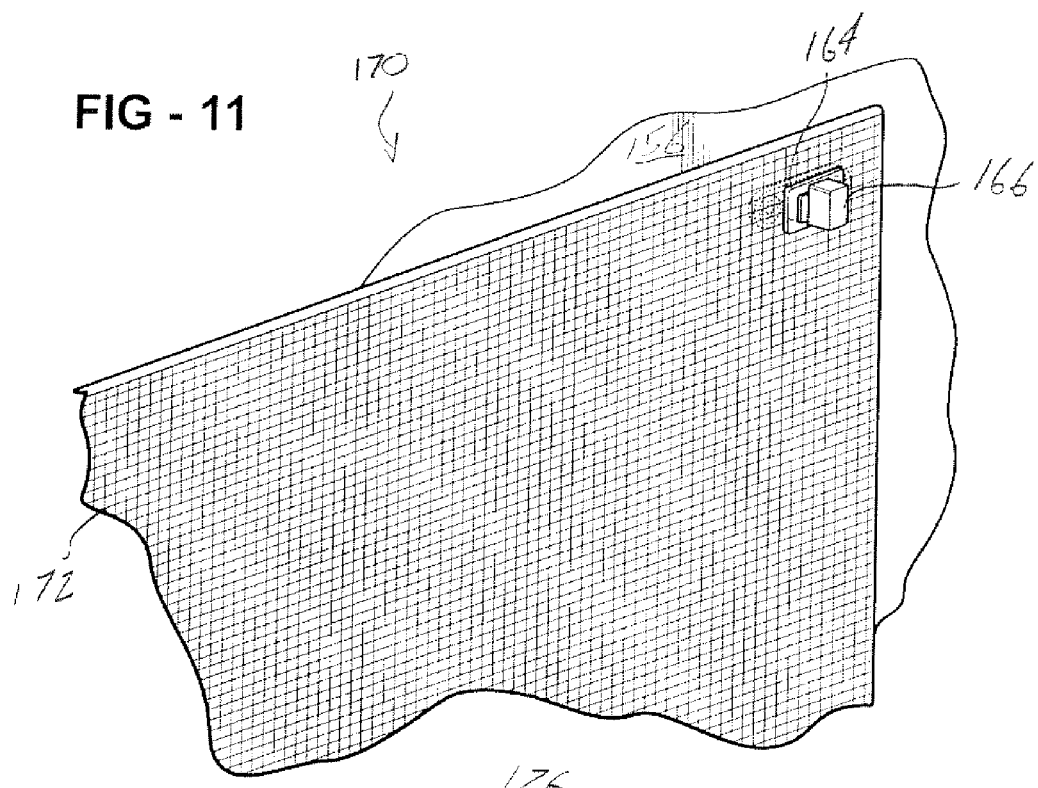
FIG. 11 is an alternative variant of the filter screen in the embodiment of FIGS. 9 and 10 and illustrating a filter without a reinforcing edge.

FIG. 11 illustrates an alternative variant 170 of the filter screen assembly, as substantially illustrated in the embodiment of FIGS. 9 and 10, and illustrating a filter screen 172 without a reinforcing edge as previously shown. Otherwise, the twist-and-lock fasteners engage in a similar fashion and as is referenced by rotatable component 166 in engaged position relative to the pre-inserted grommet 164.

Figure 12:
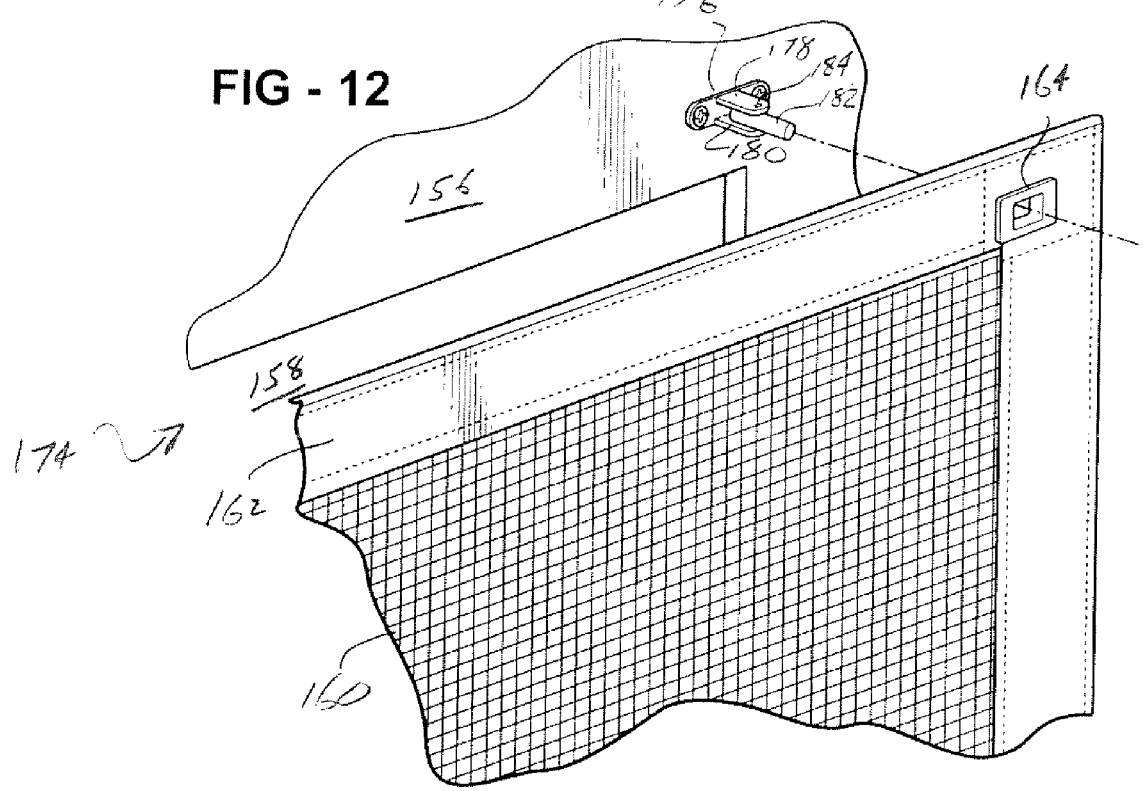
FIG. 12 is a partial exploded perspective of a cufflink style fastener component in use with a filter screen according to an eighth preferred embodiment of the present invention.

Referring now to FIG. 12, a partial exploded perspective is shown at 174 of a cufflink style fastener 176 in use with the filter screen 160 and according to an eighth preferred embodiment of the present invention. Specifically, the cufflink fastener 176 substitutes for the twist-and-lock fastener previously illustrated in FIGS. 9-11 and includes a screw mounted base in addition to a pair of spaced apart and parallel extending mounting projections, see plate-shaped support members at 178 and 180.

Figure 13:
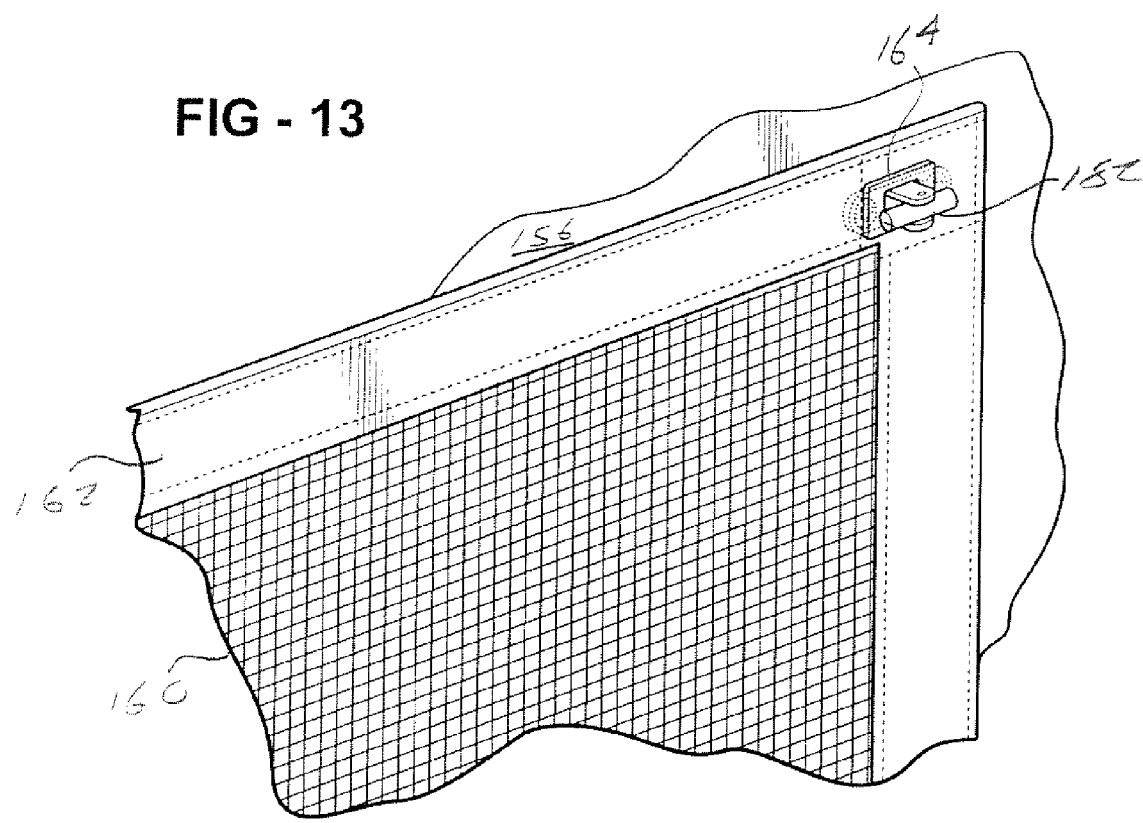
FIG. 13 is a succeeding assembled view of the cufflink style fasteners mounted to the air intake face of FIG. 12 and engaging the filter screen.

An elongate post 182 is pivotally mounted, such as by a pin 184, in rotative fashion relative to the upper 178 and lower 180 posts. In particular, and upon aligning and inserting the associated grommet 164 over the post 182 in the position of FIG. 12, the post 182 is rotated 90° in the illustration of FIG. 13, in order to mount the filter screen to the air intake face of FIG. 13 and to thereby engage the filter screen 160 in place.

Figure 14:
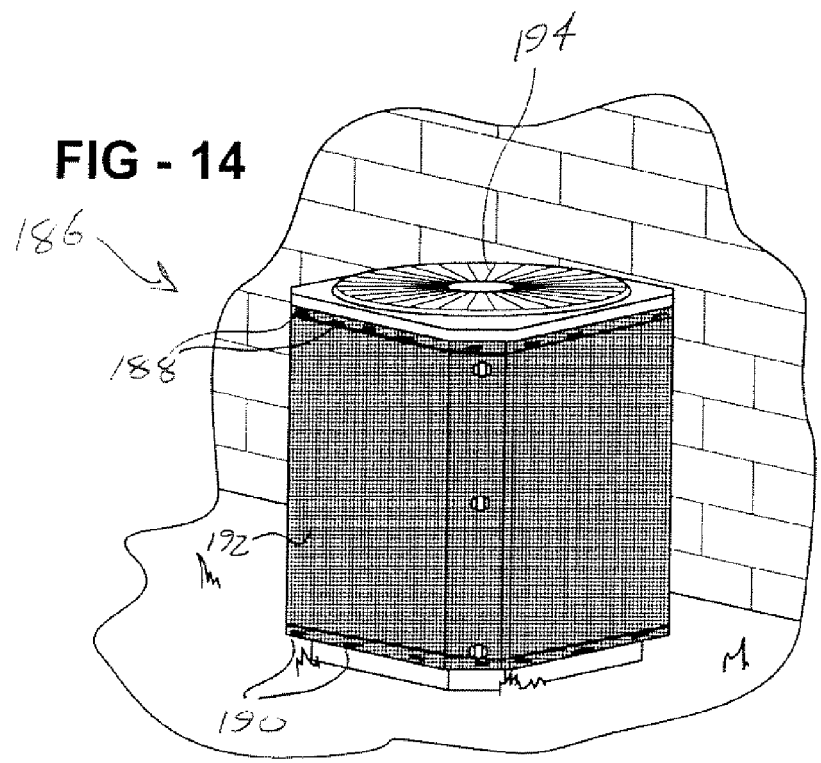
FIG. 14 is a perspective illustration of a plurality of fasteners extending horizontally along upper and lower edges associated with a filter screen and associated with smaller sized air conditioning units.

Referring to FIG. 14, a perspective illustration is shown at 186 of a plurality of fasteners, see at 188 and 190, extending horizontally along upper and lower edges, respectively, of a filter screen 192. The filter screen 192 of this embodiment is, unlike those referenced in earlier illustrations, associated with a smaller sized air conditioning unit. The purpose of the illustration of FIG. 14 is to stress that the fastener designs, and in particular those associated with the twist-and-lock as well as the cufflink style fasteners previously described, are capable of being employed with a number of differently shaped and configured air handling units, and among these including both larger sized air intake cooling tower or industrial fan units, as well as smaller residential and commercial facility sized air handling units, including most specifically portable air conditioners, such as referenced in FIG. 14 at 194.

Figure 15:
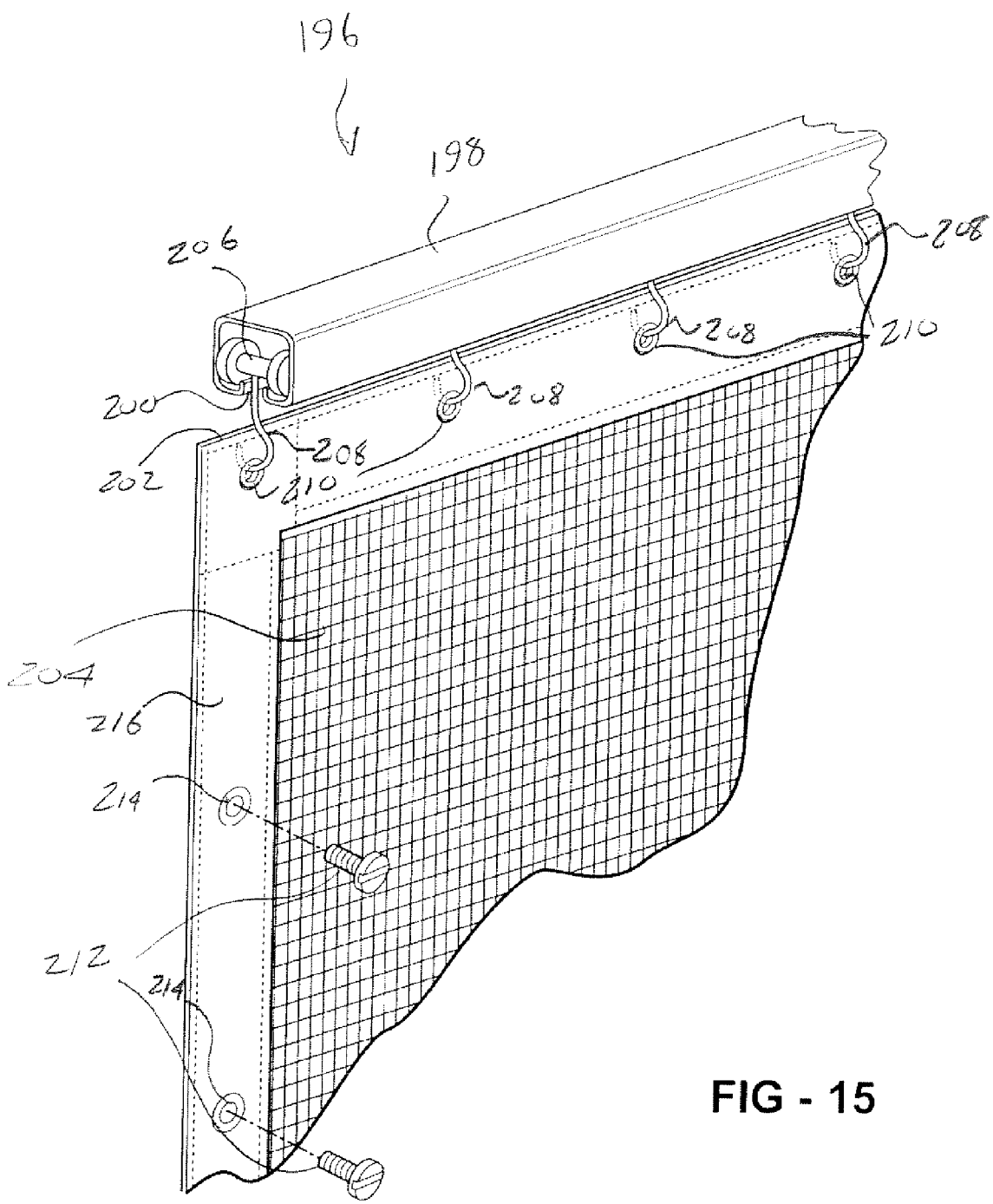
FIG. 15 is as sectional perspective illustration of an internally channeled track and trolley system in use with a filter screen and according to a ninth preferred embodiment of the present invention.

Referring now to FIG. 15, a yet further variant of a filter mounting assembly 196 contemplates the use of one or more extending "U" shaped tracks 198 secured at locations associated with either or both the upper and lower horizontal extending edges of the air intake face and proximate the air intake opening. In a preferred application, a single track 198 is secured to the air intake face proximate the upper horizontal edge and such that a laterally traversable opening 200 associated with the extruded track 198 faces downwardly in communication with a top edge 202 of a filter screen 204.

A plurality of trolley hooks are provided, each of which includes a pair of channel secured rollers and interconnecting spindle 206, and from which extends downwardly an arcuate shaped hook portion 208. A series of spaced apart ringlets, or grommets, 210 are defined at locations along the upper edge of the filter 204 and which receive associated hooks 208 in order to support the filter screen upon the track 198 and in order to translate the screen across the intake opening.

Additional fasteners, such as illustrated by conventional-type screws 212, engage additional ringlet locations 214 defined along each of the side extending edges, see edge 216 in the partial illustration of FIG. 15, and by which the filter screen 204 is secured over the intake opening. It is also important to note that, in addition to screw fasteners, any other suitable type of engaging fastener, including those drawn from any of the several embodiments described herein, can be incorporated into the filter screen assembly 196.

In addition to the elongated and substantially "U" shaped track extrusion 198 extending along the top edge of the air intake face, a second track (not shown) can be provided and which is secured along a corresponding bottom edge of the air intake face and in addition to the selected type of fastener securing at locations along the sides and, depending upon the installation of a second track extrusion, along the corresponding bottom edge of the air intake face. Either configuration allows the filter 104 to translate horizontally across the intake opening, in and out of position, and as needed based on seasonal requirements.

Figure 16:
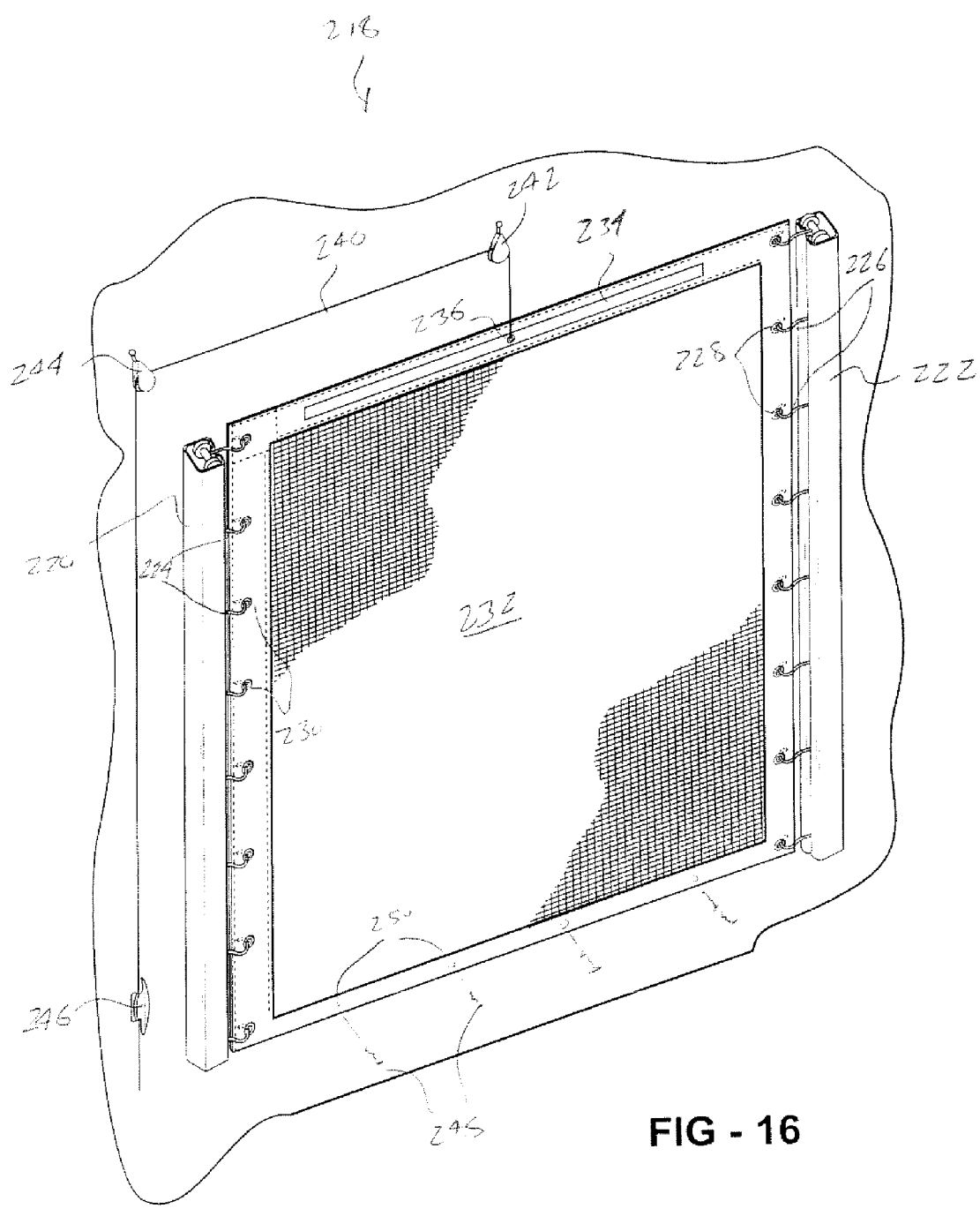
FIG. 16 is an alternate variant of a channel and trolley system of FIG. 15, in use with a pulley arrangement, and for selectively elevating and lowering an associated filter screen.

Referring finally to FIG. 16, a revised variant 218 of the mounting assembly of FIG. 15 discloses a filter installation in which a pair "U" shaped and internally channeled tracks 220 and 222 extend vertically along the sides, and as opposed to the top edge only or top and bottom edges of the air intake face. As with the previously disclosed embodiment pluralities of trolley hooks, see as generally represented at 224 and 226 and respectively for tracks 220 and 222, engage through grommets 228 and 230 extending along the associated side edges of the filter 232 and in order to secure the filter in vertically translatable fashion along the edges of the air intake face.

A stiffener 234 is incorporated into a corresponding top edge of the filter screen 232, and includes at least one location, see ringlet 236, to which is secured an extending end of a pulley supported line 240. The pulley arrangement is mounted in overhead extending fashion relative to the air intake opening and includes first 242 and second 244 turnbuckles secured at locations corresponding to above the stiffener supported ringlet 236, as well as a horizontally spaced and vertically aligning location off to a side of the filter 232.

The pulley line 240 is employed to raise and lower the filter 232, such as by grasping a lower extending end and which can be secured to a cleat 246 mounted to an accessible location on the intake structure. While not shown, it is also contemplated that any suitable motorized or mechanical cranking device may be employed for raising and lowering the filter in and out of position.

In a further application, it is also contemplated that additional fasteners may be employed, such as at 248 and which can secure to locations associated with the grommets 250 extending along the bottom corresponding edge of the filter screen 232. Additionally, the use of alternate track fastening systems and methods are also contemplated in addition to the use of a cable as described herein.

Having described our invention, other and additional preferred embodiments will become apparent to those skilled in the art to which it pertains and without deviating from the scope of the appended claims. In particular, it is contemplated that additionally and alternately configured fasteners can be employed in place of those illustrated in FIGS. 9-16. As to the variants illustrated in FIGS. 9-14, it is also envisioned that a suitable "L" shaped or other angularly configured fastener can be employed, in place of either the twist-and-lock or cufflink style fasteners, and which is mounted in either a pivotal or rotatable fashion relative to a surface located proximate to an opening of an air intake unit in order to securely engage a filter screen over the intake opening.

I claim:

1. A filter screen assembly for use with an air intake structure, the structure including at least one face within which is formed an air intake opening, said filter screen assembly comprising:

a screen comprising an air permeable material and having an outer perimeter edge;

a plurality of individual and spaced apart fasteners disposed at locations along the intake opening face surrounding the intake opening, each of said fasteners projecting from an intake face location of the structure and including a fixed component and an end projecting and rotatable component, a plurality of apertures being formed in said perimeter edge and in alignment with both said fasteners, said rotatable component projecting through said apertures and securing said screen to the air intake face, and said perimeter edge being secured by said fasteners against the intake face in order to prevent the admittance of air bypassing the air permeable material and to filter out contaminants associated with an air stream entering the intake.

2. The filter screen assembly as described in claim 1, said rotatable component associated with each of said fasteners further comprising a cufflink style fastener exhibiting a post pivotally secured to at least one extending support member of said fastener.

3. The filter screen assembly as described in claim 1, further comprising at least one axially extending stiffening element associated with said perimeter edge.

4. The filter screen assembly as described in claim 3, said perimeter edge further comprising an outer frame portion and an inner frame portion, between which is sandwichingly engaged said mesh material.

5. The filter screen assembly as described in claim 1, said at least one aperture further comprising a grommet secured to said screen edge.

6. The filter screen assembly as described in claim 1, further comprising pluralities of said fasteners disposed along at least one of upper and lower extending perimeter edges associated with said screen.

7. A filter screen assembly for use with an air intake structure, the structure including a face within which is formed an air intake opening, said filter screen assembly comprising:

a screen including a flexible mesh material and about which extends an outer perimeter edge, a plurality of perimeter defined apertures in said screen each further comprising a grommet:

a plurality of fasteners projecting from locations of an intake face surrounding the intake opening and engageable through said perimeter edge for securing said screen to the air intake face, said fasteners each further comprising an end-projecting component insertable through an aligning grommet and rotatable about an axis extending perpendicular to a surface of the air intake; and said perimeter edge being secured at specified locations against the face of the air intake structure in order to prevent air from bypassing the air permeable material, to filter out contaminants associated with an air stream entering the intake structure, and to prevent said screen from being drawn into the air intake opening.

8. A filter screen assembly for use with an air intake structure, the structure including a face within which is formed an air intake opening, said filter screen assembly comprising:

a screen including a flexible mesh material about which extends an outer perimeter edge, a plurality of perimeter defined apertures in said screen each further comprising a grommet;

a plurality of fasteners mounted to locations associated with the air intake face surrounding the intake opening and which are engageable through said perimeter edge for securing said screen to the air intake face, said fasteners each further comprising an end post insertable through an aligning grommet in a first projecting position relative to the intake face and subsequently rotatable about an axis parallel to the air intake face to a crosswise extending position overlaying said grommets to retain said screen in place; and said perimeter edge being secured at specified locations in contact with the face of the air intake structure to prevent the admittance of air bypassing the air permeable material, to filter out contaminants associated with an air stream entering the intake structure, and to prevent said screen from being drawn into the air intake opening.

9. A filter screen assembly for use with an air intake structure, the structure including at least one face within which is formed an air intake opening, said filter screen assembly comprising:

a screen comprising an air permeable material and having an outer perimeter edge;

at least one elongated and interiorly channeled track secured to the face and proximate an extending edge of the air intake opening; and a plurality of trolley hooks supported by said track and engageable with edge locations associated with said screen in order to advance said screen across the air intake opening.

10. The filter screen assembly as described in claim 9, further comprising additional perimeter edges associated with said screen being secured by fasteners.

11. The filter screen assembly as described in claim 9, further comprising said elongated and interiorly channeled track securing to the intake face proximate a top extending edge of the air intake opening.

12. The filter screen assembly as described in claim 11, further comprising a second track securing to the intake face proximate a lower extending edge of the air intake opening.

13. The filter screen assembly as described in claim 9, further comprising first and second tracks securing to the air intake face proximate side extending edges of the air intake opening.

14. The filter screen assembly as described in claim 13, further comprising a pulley arrangement engageable with a top extending edge of said screen.

15. The filter screen assembly as described in claim 14, further comprising a stiffener element associated with said top extending edge of said screen, and end of a pulley line engaging a location associated with said screen edge and facilitating raising and lowering of said screen.

16. The filter screen assembly as described in claim 15, further comprising fasteners securing at least a bottom edge of said screen to the air intake face.

* * * * *